UNITED STATES PATENT OFFICE.

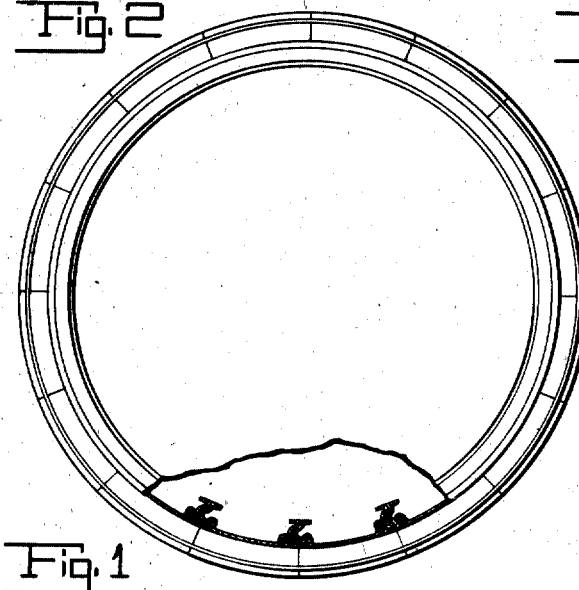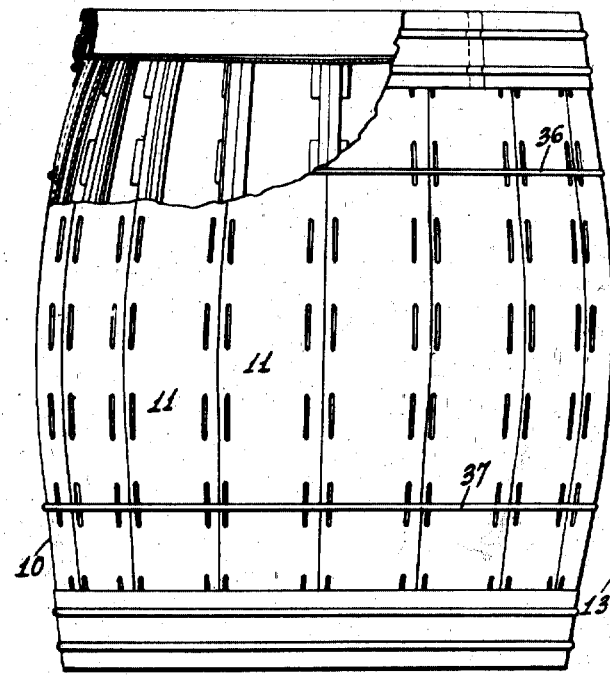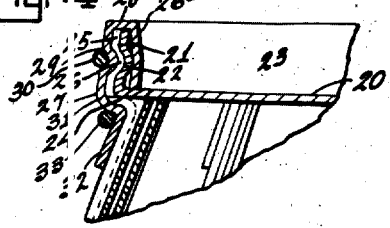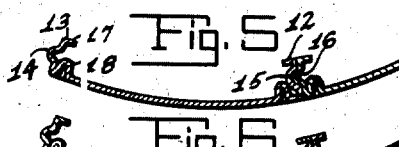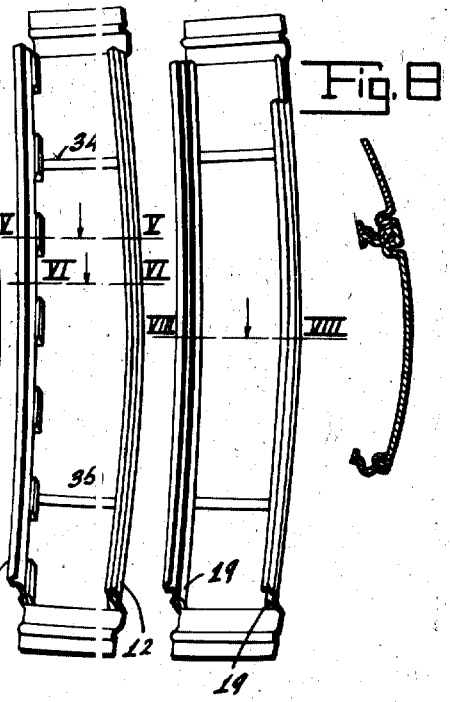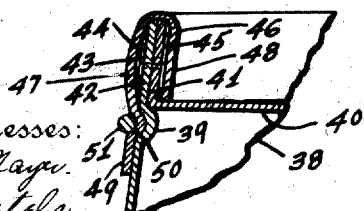

GEORGE E. HERRMANN, OF MORRISTOWN, AND BENJAMIN W. TUCKER, OF SOUTH ORANGE, NEW JERSEY.

BARREL.

1,216,808.  Specification of Letters Patent.  Patented Feb. 20, 1917.

Application filed February 17, 1912. Serial No. 678,344.

*To all whom it may concern:*

Be it known that we, GEORGE E. HERRMANN and BENJAMIN W. TUCKER, citizens of the United States, and residents of Morristown, county of Morris, State of New Jersey, and South Orange, county of Essex, and State of New Jersey, respectively, have invented certain new and useful Improvements in Barrels, of which the following is a full, clear, and exact description.

This invention relates more particularly to barrels made of sheet steel.

One of the main objects of the invention is to provide a barrel or other container formed of a plurality of staves or members having flanges extending along their edges lengthwise thereof and provided with rib-and-groove connections between said flanges to interlock the members when assembled, and the said staves or members so formed adjacent to the flanges that said flanges are not likely to spread or open at the joints.

Another object of the invention is to provide a barrel or other container in which a simple and efficient joint is provided for detachably holding the members or staves together, and which joint serves to strengthen the container.

A further object of the invention is to provide simple and efficient means for locking the barrel head or heads to the staves or members and for strengthening the barrel or container at its ends.

A still further object of the invention is to provide a barrel which is inexpensive to manufacture and which may be readily made and assembled.

With these and other objects in view, the invention will be hereinafter more particularly described with reference to the accompanying drawings, which form a part of this specification, and will then be pointed out in the claim at the end of the description.

In the drawings, Figure 1 is a side elevation, partly broken away and partly in section, of one form of barrel embodying our invention.

Fig. 2 is a plan view, partly broken away and partly in section.

Fig. 3 is a detail perspective view of one of the barrel staves or members.

Fig. 4 is an enlarged fragmentary section, showing one means for locking the head and staves or members together.

Fig. 5 is a sectional plan view taken on the line V—V of Fig. 3 showing two of the staves placed together.

Fig. 6 is a view similar to Fig. 5 except that the section is taken on the line VI—VI of Fig. 3.

Fig. 7 shows a slightly different form of the stave or member.

Fig. 8 is a sectional view taken on the line VIII—VIII of Fig. 7; and

Fig. 9 shows different means for holding the ends of the barrel staves or members and the barrel heads together.

While the invention is shown as applied more particularly to a barrel having a bilged or enlarged central portion, it will be understood that the invention may be applied to other forms of barrels or other containers.

The barrel body 10 comprises a plurality of staves or members 11. These staves or members may be variously constructed and may be curved and bilged centrally to make the barrel larger at its central portion than at its ends in order that the barrel may be handled in a manner similar to that of the ordinary wooden barrel. Each stave or member 11 has a flange 12 along one edge and a flange 13 along its other edge. These flanges extend the greater part of the length of the staves or members and the flange 13 is provided with a tongue or rib 14 extending throughout the entire length thereof and the flange 12 is provided with a depressed portion 15 forming a groove 16 lengthwise thereof. Each flange has an inwardly extending part 17 in order to prevent injury to the objects or material contained within the barrel, and said parts 17 may extend inwardly toward the body of the stave or be otherwise formed as desired. The tongues or ribs 14 of the flange 13 are adapted to fit into the groove 16 of the flange 12 of the next adjacent stave, thus serving to cause the flanges to interlock throughout substantially their entire length. The body of the staves or members may be pressed inwardly for a part of the length thereof to provide spaced inwardly projecting portions 18. These portions 18 are elongated and extend inward and are for the purpose of bracing the flanges 12 and 13 to prevent the joint from spreading when the members or staves are put together. The projecting portions 18 are located so as not to interfere with the riband-groove connection between the flanges but extend far enough to brace the flanges. The projecting portions 18 are located adjacent to the ribbed and grooved portions of the flanges 12 and 13 and extend far enough to rest against said ribbed and grooved portions and thereby prevent the flanges from being forced over or spread apart in case of strains or knocks at the joint, though instead of the projecting portions 18 being spaced apart, the said projecting bracing portions may be formed as continuous ribs or braces 19, as shown in Figs. 7 and 8, the construction in these figures being otherwise the same as in Figs. 1 to 6.

A head 20 may be located at either or both ends of the barrel body and each head is provided with an outwardly projecting flange 21 having an annular groove 22 located substantially midway between the outer edge of the flange and the body 23 of the head. The heads 20 each have their body portions resting upon shoulders formed by the ends of the flanges 12 and 13, and each head has its outer edge resting against the offset portion 24 of the staves or members, the latter terminating in substantially straight portions 25 at its ends which are adapted to lie against the flanges 21 of the heads 20. The straight portion or end 25 of each stave is provided with a rib or tongue 26 which when the staves or members are placed together form a substantially continuous rib which is adapted to enter the groove 22 of the flange 21. The flange 21 of each head 20 and the ends of the staves or members enter an annular channel formed between the flanges 25 and 26ª of a split band or compression member 27. The flange 26ª is slightly angular so as to lie closely against the inner surface of the flange 21 and has its inner edge resting against the outer surface of the head 23 and said flanges are joined together by an integral portion 28. The band 27 is provided with an annular grooved portion forming an internal bead or rib 29 which is adapted to fit into the groove formed by the tongues or ribs 26 of the staves or members. A wire tightening band or element 30 is located in the annular groove formed by the rib 29 of the compression member 27, and said member is offset, at 31, and terminates in the skirt portion 32 extending a short distance along the staves or members lengthwise thereof. A second tightening wire or band 33 is arranged under the offset portion 31 so that when the bands 30 and 33 are tightened by twisting the ends thereof or otherwise, the member 27 will be compressed thereby rigidly binding and holding the heads and members together and at the same time strengthening the ends of the barrel or container.

The staves or members are depressed transversely thereof at 34 and 35 intermediate the ends thereof to provide annular grooves when the members are put together. A wire or element 36 is located in the groove formed by the depressed parts 34 and a wire 37 or other element is located in the groove formed by the depressed parts 35, so that when these wires are tightened by having their ends twisted or otherwise, the body 10 of the barrel or container will be rigidly and effectively bound together intermediate the ends.

In Fig. 9, the body 38 may be of any suitable construction and may comprise a plurality of members constructed as already described. The staves or members may be depressed transversely to form a grooved portion 39 against which is adapted to rest the edge of one of the heads 40. Each head 40 has an outwardly projecting flange 41, and the outer ends 42 of the staves or members may be straight and are adapted to lie against the outer surface of the flange 41. The part 42 and the flange 41 of the head 40 may be provided with apertures spaced apart and passing through these apertures may be a suitable fastener. As shown, an ordinary paper fastener 43 is provided for this purpose, there being a series of these fasteners varying in number as desired and each having a head portion 44 with the bendable ends 45 which are adapted to be passed through the openings in the ends of the staves or members and the flange 41 of the head and then bent along said flange on the inner surface thereof in the manner shown, thus holding the members and heads together. A divided or other band or member 46 is provided. This band is compressible and has its outer part hook-shaped to form a channel to receive the flange 41 and the ends of the barrel staves, and said hook-shaped part may be formed by a flange 47 and a flange 48 the latter lying parallel with the flange 41 of the barrel head 40 and within the same so that its inner edge will rest against the outer surface of the head. This member or band 47 may have its skirt portion 49 extending inward along the barrel members for a short distance and may have a ribbed or beaded portion 50 forming an annular groove, the said portion being adapted to enter the grooved ribbed portion 49 of the members. A wire band or element 51 is located in the groove 50 and when its ends are bound together by twisting or otherwise, the band 46 may be compressed so as to hold the head and staves or members together and further to strengthen the ends of the barrel.

From the foregoing, it will be seen that a simple and efficient barrel or other container is provided; that said barrel or container may have its staves or members interlocked and such interlocked portions braced by integral parts formed from the members and projecting from the body thereof; that the joints between the members as constructed are effective and are not likely to open or spread when the members are subjected to strain while in use; that said members may be detached in case of injury or for any other reason; and that said barrel is inexpensive to manufacture and may be readily made and assembled.

Having thus described our invention, we claim as new and desire to secure by Letters Patent:—

A barrel or other container, comprising a plurality of members having flanges extending inwardly therefrom at their edges and for the greater part of their length, said flanges being provided with rib and groove connections throughout their entire length, and elongated integral bracing projecting portions located at the base of the flanges adjacent thereto and engaging a part of the same to prevent the flanges from opening under strain, heads located within the body at the ends thereof and resting against the flanges and means for holding the members and heads together.

This specification signed and witnessed this 13th day of February, A. D. 1912.

GEORGE E. HERRMANN.
BENJAMIN W. TUCKER.

Witnesses:
FRANCES KINREICH,
C. BARTELS.